United States Patent [19]

Saito et al.

[11] Patent Number: 4,806,417

[45] Date of Patent: Feb. 21, 1989

[54] MAGNETIC RECORDING MEDIUM

[75] Inventors: Shinji Saito; Hiroaki Araki; Kiyomi Ejiri; Hiroshi Ogawa; Chiaki Mizuno, all of Kanagawa, Japan

[73] Assignee: Fuji Photo Film Co., Ltd., Kanagawa, Japan

[21] Appl. No.: 110,291

[22] Filed: Oct. 20, 1987

[30] Foreign Application Priority Data

Oct. 20, 1986 [JP] Japan .................. 61-248863

[51] Int. Cl.$^4$ .............................................. G11B 5/70
[52] U.S. Cl. ................................. 428/323; 427/128; 428/694; 428/900
[58] Field of Search ............... 428/522, 694, 900, 328, 428/329, 695, 323; 252/62.54; 427/128, 131; 360/134–136

[56] References Cited

U.S. PATENT DOCUMENTS

| | | | |
|---|---|---|---|
| 4,407,901 | 10/1983 | Miyatsuka | 428/329 |
| 4,439,486 | 3/1984 | Yamada | 428/900 |
| 4,571,364 | 2/1986 | Kasuga | 428/900 |
| 4,587,170 | 5/1986 | Hanai | 428/329 |
| 4,594,174 | 6/1986 | Nakayama | 428/423.9 |
| 4,600,521 | 7/1986 | Nakamura | 428/900 |
| 4,652,388 | 3/1987 | Gold | 428/900 |
| 4,690,863 | 9/1987 | Miyoshi | 428/329 |
| 4,707,410 | 11/1987 | Hata | 428/694 |
| 4,707,411 | 11/1987 | Nakayama | 428/694 |

FOREIGN PATENT DOCUMENTS 5425  1/1984  Japan .

Primary Examiner—Paul J. Thibodeau
Attorney, Agent, or Firm—Sughrue, Mion, Zinn, Macpeak & Seas

[57] ABSTRACT

An improvement of a magnetic recording medium comprising a nonmagnetic support and a magnetic recording layer provided on the support which comprises a binder and a ferromagnetic powder dispersed therein is disclosed. The binder contains a resin component having a metal sulfonate group and the ferromagnetic powder contains water in an amount corresponding to moles of 20-80 times as much as the number of moles of the metal sulfonate group contained in the binder.

8 Claims, No Drawings

MAGNETIC RECORDING MEDIUM

BACKGROUND OF THE INVENTION

1. Field of the Invention

The present invention relates to a magnetic recording medium comprising a nonmagnetic support and a magnetic recording layer

2. Description of Prior Art

A magnetic recording medium has been widely used as a tape for recording music (i.e., an audio tape), a video tape and a floppy disc. The magnetic recording medium basically comprises a nonmagnetic support and a magnetic recording layer provided on the support, and the magnetic recording layer comprises a binder and a ferromagnetic powder dispersed therein.

The magnetic recording medium is desired to show high levels in various properties such as electromagnetic conversion characteristics, running endurance and running property. Particularly, the recording medium is desired to show excellent electromagnetic conversion characteristics. For example, an audio tape is required to have high reproducibility of original sounds, and a video tape is required to have high reproducibility of an original image. Such high electromagnetic conversion characteristics is desired particularly in the case of using an 8 mm type video tape recorder.

It is known that the electromagnetic conversion characteristics of the magnetic recording medium using a ferromagnetic powder greatly varies depending upon dispersibility (or dispersed condition) of the ferromagnetic powder in the magnetic recording layer. In more detail, even if a ferromagnetic powder having excellent magnetic property is used for the purpose of enhancing the electromagnetic conversion characteristics of the resulting medium, the excellent magnetic property of the ferromagnetic powder is not reflected on the enhancement of the electromagnetic conversion characteristics when the ferromagnetic powder is poorly dispersed in the recording layer.

For improving the dispersibility of the ferromagnetic powder in the magnetic recording layer, there has been utilized a method of kneading or dispersing the ferromagnetic powder for a long period of time in the preparation of a magnetic paint for forming a magnetic recording layer. However, such long-time kneading or dispersing causes deterioration of the magnetic property of the ferromagnetic powder, and therefore a measure of incorporating a polar group into a resin component for forming a binder of a recording layer is recently utilized so as to make the binder show a favorable affinity for the ferromagnetic powder.

For example, Japanese Patent Provisional Publication No. 59(1984)-5424 discloses a magnetic recording medium in which a resin component having a specific polar group such as a metal sulfonate group is employed in an amount of not less than 50 wt.% as a binder of the magnetic recording layer using a ferromagnetic metal powder of needle shape having a coercive force (Hc) of not less than 1,000 Oe and a specific surface area (S-BET) of not less than 45 m²/g (determined according to a BET method). By employing such resin having a specific polar group as a resin component of the binder, a magnetic recording medium in which the ferromagnetic powder is well dispersed in the magnetic recording layer can be prepared, and the resulting medium is highly improved in the electromagnetic conversion characteristics.

SUMMARY OF THE INVENTION

The present inventors have studied to further improve the dispersibility of a ferromagnetic powder so as to further enhance the electromagnetic conversion characteristics of the recording medium.

It is an object of the present invention to provide a magnetic recording medium such as an audio tape or a video tape which is improved in electromagnetic conversion characteristics.

There is provided by the present invention a magnetic recording medium comprising a nonmagnetic support and a magnetic recording layer provided on the support which comprises a binder and a ferromagnetic powder dispersed therein, wherein said binder contains a resin component having a sulfonic acid metal salt group (i.e., metal sulfonate group) and said ferromagnetic powder contains water in an amount corresponding to moles of 20–80 times (preferably 40–60 times) as much as the number of moles of the metal sulfonate group contained in the binder.

In the present invention, a resin containing a resin component having a metal sulfonate group is employed as a binder for the formation of a magnetic recording layer, and a specific amount of water is incorporated into the ferromagnetic powder (most of the water contained in the ferromagnetic powder is thought to be in the adsorbed state on the surface of the powder), whereby the dispersibility of the ferromagnetic powder in the recording layer is highly improved, and as a result, the resulting magnetic recording medium is prominently enhanced in the electromagnetic conversion characteristics.

In the case of using a ferromagnetic metal powder, the ferromagnetic metal powder is apt to be poorly dispersed in the binder for the reasons of of its surface property and fine particles thereof, and accordingly the present invention is particularly advantageously applied to a magnetic recording medium such as an audio tape or an 8 mm type video tape using a ferromagnetic metal powder.

DETAILED DESCRIPTION OF THE INVENTION

The magnetic recording medium of the present invention basically comprises a nonmagnetic support and a magnetic recording layer provided on the support which comprises a ferromagnetic powder dispersed in a binder.

As a material of the nonmagnetic support, there can be selected from those conventionally used for a nonmagnetic support of a known magnetic recording medium. Examples of the material include polyethylene terephthalate, polypropylene, polycarbonate, polyethylene naphthalate, polyamide, polyamideimide, polyimide, and metallic foils such as aluminum foil and stainless steel foil. The thickness of the nonmagnetic support is generally in the range of 3 to 50 $\mu$m, preferably in the range of 5 to 30 $\mu$m.

The nonmagnetic support may have a back layer (or backing layer) on the opposite side of the side where a magnetic recording layer is to be coated.

There is no specific limitation on the ferromagnetic powder employable in the invention, and various ferromagnetic powders such as powders of $\gamma$-iron oxide and Co-containing $\gamma$-iron oxide can be employed. Preferred is a ferromagnetic metal powder. The ferromagnetic metal powder is a powder mainly containing a ferromagnetic metal such as iron, cobalt, nickel and alloy thereof.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni and Co-Ni-Fe) and the remaining metal component, if present, comprises other atom(s) (e.g., Si, S, Sc, Ti, V, Cr, Mn, Cu, Zn, Y, Mo, Rh, Pd, Ag, W, Sn, Sb, B, Te, Ba, Ta, Re, P, Au, Hg, Bi, La, Ce, Pr, Nd, Pb, Zn). The ferromagnetic metal powder may contain a small amount of hydroxide or oxide.

The ferromagnetic metal powder preferably has a specific surface area of not less than 42 m$^2$/g, more preferably not less than 45 m$^2$/g, and a coercive force of not less than 800 Oe, more preferably not less than 1,000 Oe. The ferromagnetic metal powder normally used is in a needle shape, grain shape, dice shape, rice shape or plate shape. Preferred is a ferromagnetic metal powder in a needle shape. In the magnetic recording medium of the invention, even if the above-mentioned ferromagnetic metal powder of needle shape having a high coercive force is used, the ferromagnetic metal powder is well dispersed in the recording layer by introducing a specific amount of water into the ferromagnetic powder and using a resin component having a metal sulfonate group as a binder component, whereby the excellent magnetic property of the ferromagnetic metal powder hardly deteriorates.

Adjustment of the amount of water introduced into the ferromagnetic powder to be incorporated into the magnetic recording layer of the recording medium according to the invention is easily made by storing the ferromagnetic powder in a container which is adjusted with respect to humidity.

The magnetic recording layer preferably contains an abrasive. Normally used is an abrasive having a mean particle diameter of 0.1 to 1.0 μm, preferably 0.1 to 0.5 μm. The amount of the abrasive contained in the magnetic recording layer is generally in the range of 1 to 10 parts by weight, preferably 2 to 8 parts by weight, more preferably 3 to 6 parts by weight, based on 100 parts by weight of the ferromagnetic powder. Examples of the abrasives include α-alumina, chromium oxide, α-iron oxide.

The magnetic recording layer of the magnetic recording medium according to the invention contains a binder component (resin component) having a metal sulfonate group in an amount of preferably 5 to 50 parts by weight, more preferably 10 to 30 parts by weight, based on 100 parts by weight of the ferromagnetic powder.

A metal component of the metal sulfonate group is preferably an alkali metal, and particularly preferred is sodium.

Examples of the resin components composing a base component of the binder having a metal sulfonate group include vinyl chloride copolymers, vinylidene chloride copolymers, polyester resins, acrylic resins, polyvinyl acetal resins, polyvinyl butyral resins, phenoxy resins, epoxy resins, butadiene/acrylonitrile copolymers, polyurethane resins and urethane epoxy resins. These resins can be employed in the invention independently or in combination. Particularly preferred is a vinyl chloride copolymer.

In the invention, it is preferred to use a combination of a vinyl chloride copolymer having a metal sulfonate group and a polyurethane resin as a resin component of the binder.

The amount of the metal sulfonate group contained in the resin component having a metal sulfonate group is preferably in the range of $1 \times 10^{-5}$ to $5 \times 10^{-4}$ mol/g.

The number average molecular weight of the vinyl chloride copolymer is generally in the range of 10,000 to 200,000, preferably 10,000 to 100,000, more preferably 15,000 to 60,000.

The vinyl chloride copolymer having a metal sulfonate group can be prepared by copolymerizing a vinyl chloride monomer and a monomer having a metal sulfonate group and a reactive double bond such as 2-(meth)acrylamide-2-methylpropane sulfonic acid alkali metal salt, vinyl sulfonic acid alkali metal salt and (meth)acrylic acid-2-sulfonic acid alkali metal salt according to a known method.

In the preparation of a vinyl chloride copolymer, other monomers such as vinyl ether, α-monoolefin, acrylic acid ester, unsaturated nitrile, aromatic vinyl and vinyl ester can be incorporated in combination provided that the incorporation thereof does not give an adverse effect to the resulting vinyl chloride copolymer.

In the case of using the vinyl chloride copolymer in combination with the polyurethane resin as a binder, the ratio between the vinyl chloride copolymer and the polyurethane resin is generally in the range of 35:65 to 99:1 (vinyl chloride copolymer : polyurethane resin, by weight), preferably 40:60 to 96:4. In the case of using such combination, the ferromagnetic powder is apt to be better dispersed as compared with the case of using other resin component.

Further, the binder is preferably a curable material in which a polyisocyanate compound is added to the above-mentioned vinyl chloride copolymer and polyurethane resin.

As the polyisocyanate compound, there can be mentioned those conventionally employed. Examples of the polyisocyanate compound employable in the invention include reaction products of 3 moles of diisocyanate (e.g., diphenylmethane-4,4'-diisocyanate and tolylene diisocyanate) and 1 mol of trimethylolpropane, burette adducts of 3 moles of hexamethylene diisocyanate, isocyanurate adduct compounds of 5 moles of tlyledine isocyanate, isocyanurate adduct compounds of 3 moles of tolylene diisocyanate and 2 moles of hexamethylene diisocyanate, and polymers of diphenylmethane diisocyanate.

The amount of the polyisocyanate compound is generally the same or not larger than that of the employed polyurethane resin.

By using the above-mentioned polyurethane resin, vinyl chloride copolymer and polyisocyanate compound as the binder, the polyisocyanate compound can make a three dimensional crosslinking structure between the polyurethane resin and the vinyl chloride copolymer, and thereby a binder of high strength can be prepared.

The magnetic recording layer according to the invention may further contain other additives such as a lubricant and an antistatic agent.

A process of the magnetic recording medium of the present invention is described hereinafter.

In the first place, the above-described ferromagnetic powder having a water content specified in the invention, binder and other additives (if desired) are dispersed in an organic solvent to prepare a magnetic paint. The magnetic paint is then coated over a nonmagnetic support to give a coated layer of the magnetic paint having dry thickness of 0.2 to 10 μm. The support with the coated layer is then subjected to various treatments such as a magnetic orientation, a drying process, a surface smoothening process and a curing treatment. The resulting sheet is then cut or slit into a desired shape to prepare a magnetic recoding medium.

The magnetic recording layer is generally provided on the nonmagnetic support by directly coating a magnetic paint over the support, but it is also possible to provide the recording layer on the support by way of an adhesive layer or an undercoating layer.

Processes for the preparation of a magnetic paint, a coating method and various treatments such as a magnetic orientation, a drying process, a surface smoothening process and a curing treatment are already known, and those known processes can be applied to the magnetic recording medium of the invention.

The examples and the comparison examples of the present invention are given below. In the following examples, the expression "part(s)" means "part(s) by weight", unless otherwise specified.

EXAMPLE 1

Composition of Magnetic Paint

Ferromagnetic metal powder: 100 parts
Vinyl chloride copolymer containing sodium sulfonate group: 20 parts
Polyester polyurethane resin: 5 parts
α-Alumina: 3 parts
Carbon black: 1 part
Lauric acid: 3 parts
Butyl acetate: 350 parts The ferromagnetic metal powder listed above is a Fe-Zn-Ni alloy having a copolymerization ratio of 94:4:2 (Fe:Zn:Ni), a specific surface area (S-BET) of 40 m$^2$/g, a coercive force (Hc) of 1,200 Oe, a saturation magnetic moment ($\sigma$s) of 135 emu/g, and a water content of $4.0 \times 10^{-4}$ mol/g. The vinyl chloride copolymer containing sodium sulfonate group also listed above is a vinyl chloride copolymer having a content of sodium sulfonate group of $5.0 \times 10^{-5}$ mol/g and a polymerization degree of 300, in which vinyl chloride, 2-acrylamido-2-methylpropane sodium sulfonate and glycidyl methacrylate are copolymerized.

The components indicated above were kneaded in a sand mill to prepare a magnetic paint. The magnetic paint was coated over a surface of a polyethylene terephthalate support of 7 μm thick by means of a reverse roll to give a coated layer of the magnetic paint having thickness of 4.0 μm (in dry basis).

The nonmagnetic support with the coated layer of the magnetic paint was then subjected to a magnetic orientation under wet condition, and subsequently subjected to a drying process and a supercalendering. The resulting sheet was slit to give an audio tape having a width of 3.8 mm.

EXAMPLE 2

The procedure of Example 1 was repeated except for varying the water content in the ferromagnetic metal powder to $2.0 \times 10^{-4}$ mol/g to prepare an audio tape.

EXAMPLE 3

The procedure of Example 1 was repeated except for varying the water content in the ferromagnetic metal powder to $7.0 \times 10^{-4}$ mol/g to prepare an audio tape.

COMPARISON EXAMPLE 1

The procedure of Example 1 was repeated except for using a vinyl chloride copolymer not containing any sodium sulfonate group (vinyl chloride/vinyl acetate/maleic anhydride copolymer) instead of the vinyl chloride copolymer containing a sodium sulfonate group to prepare an audio tape.

COMPARISON EXAMPLE 2

The procedure of Example 1 was repeated except for varying the water content in the ferromagnetic metal powder to $1.0 \times 10^{-4}$ mol/g to prepare an audio tape.

COMPARISON EXAMPLE 3

The procedure of Example 1 was repeated except for varying the water content in the ferromagnetic metal powder to $1.0 \times 10^{-3}$ mol/g to prepare an audio tape.

The audio tapes obtained in Examples 1 to 3 and Comparison Examples 1 to 3 were evaluated on surface glossiness of the magnetic recording layer, squareness ratio, maximum output level (MOL), saturation output level (SOL) and occurrence of stain on a tape pad and a magnetic head equipped in the recording apparatus (tape recorder) according to the following tests.

The results of the evaluations are set forth in Table 1.

Surface glossiness

The surface glossiness of the magnetic layer was measured by using a surface glossmeter (GK-45D type, produced by Suga Testing Machine Co., Ltd.). The surface glossiness of a standard black surface is 87% when measured by the same glossmeter.

Squareness ratio

The squareness ratio was determined by measuring a ratio of Br/Bm at an external magnetic field intensity (Hm) of 2 KOe (159 kA/m) by means of a vibrating sample magnetic flux measuring machine (produced by Toei Industry Co., Ltd.).

Maximum output level (MOL)

A signal of 315 Hz was recorded on the audio tape, and the recorded signal was reproduced to measure its maximum output level (MOL, third radiofrequency wave: 3%) by means of a measuring machine (TCK-777ESII type, produced by Sony Corp., Ltd.). The maximum output level is expressed by a relative value based on the MOL value of the audio tape obtained in Comparison Example 1 being 0 dB.

Saturation output level (SOL)

A signal of 10 kHz was recorded on the audio tape, and the recorded signal was reproduced to measure its saturation output level (SOL) by means of the same measuring machine as that used for measuring the above-mentioned MOL values. The saturation output level is expressed by a relative value based on the SOL value of the audio tape obtained in Comparison Example 1 being 0 dB.

Occurrence of stain

The audio tape was repeatedly run in a commercially available tape recorder at 20 times, and then occurrence of stain on a tape pad and a magnetic head equipped in the tape recorder was observed.

TABLE 1

|  | Example | | | Com. Example | | |
| --- | --- | --- | --- | --- | --- | --- |
|  | 1 | 2 | 3 | 1 | 2 | 3 |
| Water content (molar ratio) | 40 | 20 | 70 | — | 10 | 100 |
| Surface glossiness (%) | 250 | 248 | 250 | 220 | 230 | 237 |
| Squareness ratio | 0.87 | 0.86 | 0.86 | 0.78 | 0.83 | 0.82 |
| MOL (dB) | +1.7 | +1.4 | +1.5 | 0 | +0.8 | +0.4 |
| SOL (dB) | +0.7 | +0.6 | +0.6 | 0 | +0.1 | +0.1 |
| Occurrence of stain | none | none | none | observed | none | none |

EXAMPLE 4

The procedure of Example 1 was repeated except for using a vinyl chloride copolymer having a content of sodium sulfonate group of $2.0 \times 10^{-5}$ mol/g and the same other conditions as those of the vinyl chloride copolymer used in Example 1, and varying the water content in the ferromagnetic metal powder to $1.5 \times 10^{-4}$ mol/g, to prepare an audio tape.

EXAMPLE 5

The procedure of Example 4 was repeated except for varying the water content in the ferromagnetic metal powder to $8.0 \times 10^{-5}$ mol/g to prepare an audio tape.

EXAMPLE 6

The procedure of Example 4 was repeated except for varying the water content in the ferromagnetic metal powder to $3.0 \times 10^{-4}$ mol/g to prepare an audio tape.

COMPARISON EXAMPLE 4

The procedure of Example 4 was repeated except for varying the water content in the ferromagnetic metal powder to $5.5 \times 10^{-5}$ mol/g to prepare an audio tape.

COMPARISON EXAMPLE 5

The procedure of Example 4 was repeated except for varying the water content in the ferromagnetic metal powder to $4.0 \times 10^{-4}$ mol/g to prepare an audio tape.

The audio tapes obtained in Examples 4 to 6 and Comparison Examples 4 and 5 were evaluated on surface glossiness of the magnetic recording layer, squareness ratio, maximum output level (MOL), saturation output level (SOL) and occurrence of stain on a tape pad and a magnetic head equipped in the recording apparatus (tape recorder) according to the aforementioned tests.

The results of the evaluations are set forth in Table 2.

TABLE 2

|  | Example | | | Com. Example | |
| --- | --- | --- | --- | --- | --- |
|  | 4 | 5 | 6 | 4 | 5 |
| Water content (molar ratio) | 37.5 | 20 | 75 | 13.8 | 100 |
| Surface glossiness (%) | 244 | 241 | 242 | 226 | 232 |
| Squareness ratio | 0.85 | 0.85 | 0.85 | 0.81 | 0.79 |
| MOL (dB) | +1.3 | +1.3 | +1.3 | +0.4 | +0.1 |
| SOL (dB) | +0.5 | +0.4 | +0.4 | +0.1 | +0.2 |
| Occurrence of stain | none | none | none | observed | observed |

EXAMPLE 7

The procedure of Example 1 was repeated except for using a vinyl chloride copolymer having a content of sodium sulfonate group of $1.0 \times 10^{-4}$ mol/g and the same other conditions as those of the vinyl chloride copolymer used in Example 1, and varying the water content in the ferromagnetic metal powder to $6.0 \times 10^{-4}$ mol/g, to prepare an audio tape.

EXAMPLE 8

The procedure of Example 7 was repeated except for varying the water content in the ferromagnetic metal powder to $3.0 \times 10^{-4}$ mol/g to prepare an audio tape.

EXAMPLE 9

The procedure of Example 7 was repeated except for varying the water content in the ferromagnetic metal powder to $1.0 \times 10^{-3}$ mol/g to prepare an audio tape.

COMPARISON EXAMPLE 6

The procedure of Example 7 was repeated except for varying the water content in the ferromagnetic metal powder to $2.0 \times 10^{-4}$ mol/g to prepare an audio tape.

COMPARISON EXAMPLE 7

The procedure of Example 7 was repeated except for varying the water content in the ferromagnetic metal powder to $1.6 \times 10^{-3}$ mol/g to prepare an audio tape.

The audio tapes obtained in Examples 7 to 9 and Comparison Examples 6 and 7 were evaluated on surface glossiness of the magnetic recording layer, squareness ratio, maximum output level (MOL), saturation output level (SOL) and occurrence of stain on a tape pad and a magnetic head equipped in the recording apparatus (tape recorder) according to the aforementioned tests.

The results of the evaluations are set forth in Table 3.

TABLE 3

|  | Example | | | Com. Example | |
| --- | --- | --- | --- | --- | --- |
|  | 7 | 8 | 9 | 6 | 7 |
| Water content (molar ratio) | 30 | 20 | 60 | 10 | 100 |
| Surface glossiness (%) | 252 | 248 | 250 | 232 | 237 |
| Squareness ratio | 0.86 | 0.85 | 0.85 | 0.83 | 0.82 |
| MOL (dB) | +1.9 | +1.8 | +1.7 | +0.7 | +0.6 |
| SOL (dB) | +0.6 | +0.5 | +0.6 | +0.2 | +0.2 |
| Occurrence of stain | none | none | none | none | none |

EXAMPLE 10

Composition of Magnetic Paint

Ferromagnetic metal powder: 100 parts
Vinyl chloride copolymer containing sodium sulfonate group: 12 parts Polyester polyurethane resin: 8 parts
α-Alumina: 5 parts
Stearic acid: 2 parts
Butyl stearate: 2 parts
Cyclohexanone: 100 parts
Methyl ethyl ketone: 250 parts The ferromagnetic metal powder listed above is a Fe-Zn-Ni alloy having a copolymerization ratio of 94:4:2 (Fe:Zn:Ni), a specific surface area (S-BET) of 50 m$^2$/g, a coercive force (Hc) of 1,400 Oe, a saturation magnetic moment ($\sigma$s) of 125 emu/g, and a water content of $2.0 \times 10^{-4}$ mol/g. The vinyl chloride copolymer containing sodium sulfonate group also listed above is a vinyl chloride copolymer having a content of a sodium sulfonate group of $5 \times 10^{-5}$ mol/g and a polymerization degree of 300, in which vinyl chloride, 2-acrylamido-2-methylpropane sodium sulfonate and glycidyl methacrylate are copolymerized.

The components indicated above were kneaded in a sand mill to give a dispersion. To the dispersion was added 5 parts of a polyisocyanate compound, and they were kneaded to prepare a magnetic paint. The magnetic paint was coated over a surface of a polyethylene terephthalate support of 10 μm thick by means of a reverse roll to give a coated layer of the magnetic paint having thickness of 3.0 μm (in dry basis).

The nonmagnetic support with the coated layer of the magnetic paint was then subjected to a magnetic orientation under wet condition, and subsequently subjected to a drying process and a supercalendering. The resulting sheet was slit to give a video tape having a width of 8 mm.

EXAMPLE 11

The procedure of Example 10 was repeated except for varying the water content in the ferromagnetic metal powder to $1.5 \times 10^{-4}$ mol/g to prepare a video tape.

EXAMPLE 12

The procedure of Example 10 was repeated except for varying the water content in the ferromagnetic metal powder to $4.5 \times 10^{-4}$ mol/g to prepare a video tape.

COMPARISON EXAMPLE 8

The procedure of Example 10 was repeated except for using a vinyl chloride copolymer not containing any sodium sulfonate group (vinyl chloride/vinyl acetate/maleic anhydride copolymer) instead of the vinyl chloride copolymer containing a sodium sulfonate group to prepare a video tape.

COMPARISON EXAMPLE 9

The procedure of Example 10 was repeated except for varying the water content in the ferromagnetic metal powder to $1.0 \times 10^{-4}$ mol/g to prepare a video tape.

COMPARISON EXAMPLE 10

The procedure of Example 10 was repeated except for varying the water content in the ferromagnetic metal powder to $6.0 \times 10^{-4}$ mol/g to prepare a video tape.

The video tapes obtained in Examples 10 to 12 and Comparison Examples 8 to 10 were evaluated on surface glossiness of the magnetic recording layer and squareness ratio according to the aforementioned tests, and further evaluated on video output level, S/N ratio and tendency of clogging on a magnetic head according to the following tests.

The results of the evaluation are set forth in Table 4.

Video output level (VS)

A signal of 4 MHz was recorded on the video tape, and the recorded signal was reproduced to measure a video output level by means of a measuring machine (FUJIX-8, produced by Fuji Photo Film Co., Ltd.). The video output is expressed by a relative value based on the video output of the video tape obtained in Comparison Example 8 being 0 dB.

S/N ratio

A signal of 4 MHz was recorded on the video tape, and the recorded signal was reproduced to measure a S/N ratio by means of a measuring machine (FUJIX-8, produced by Fuji Photo Co., Ltd.). The S/N ratio is expressed by a relative value based on the S/N ratio of the video tape obtained in Comparison Example 8 being 0 dB.

Clogging on a magnetic head

The video tape was repeatedly run in a commercially available tape recorder (FUJIX-8, produced by Fuji Photo Film Co., Ltd.) at 20 times, and then the tendency of clogging on a magnetic head was observed.

TABLE 4

|  | Example | | | Com. Example | | |
| --- | --- | --- | --- | --- | --- | --- |
|  | 10 | 11 | 12 | 8 | 9 | 10 |
| Water content (molar ratio) | 40 | 25 | 75 | — | 0.6 | 0.6 |
| Surface glossiness (%) | 258 | 254 | 256 | 225 | 238 | 244 |
| Squareness ratio | 0.82 | 0.81 | 0.81 | 0.76 | 0.81 | 0.79 |
| S/N ratio (dB) | +1.1 | +0.9 | +0.8 | 0 | +0.2 | +0.3 |
| Video output (dB) | +1.1 | +1.1 | +1.0 | 0 | +0.3 | +0.2 |
| Clogging on magnetic head | none | none | none | observed | none | none |

EXAMPLE 13

The procedure of Example 10 was repeated except for using a vinyl chloride copolymer having a content of sodium sulfonate group of $2.0 \times 10^{-5}$ mol/g and the same other conditions as those of the vinyl chloride copolymer used in Example 10, and varying the water content in the ferromagnetic metal powder to $9.0 \times 10^{-5}$ mol/g, to prepare a video tape.

EXAMPLE 14

The procedure of Example 13 was repeated except for varying the water content in the ferromagnetic metal powder to $6.0 \times 10^{-5}$ mol/g to prepare a video tape.

EXAMPLE 15

The procedure of Example 13 was repeated except for varying the water content in the ferromagnetic metal powder to $1.5 \times 10^{-4}$ mol/g to prepare a video tape.

COMPARISON EXAMPLE 11

The procedure of Example 13 was repeated except for varying the water content in the ferromagnetic metal powder to $3.0 \times 10^{-5}$ mol/g to prepare a video tape.

COMPARISON EXAMPLE 12

The procedure of Example 13 was repeated except for varying the water content in the ferromagnetic metal powder to $2.5 \times 10^{-4}$ mol/g to prepare a video tape.

The video tapes obtained in Examples 13 to 15 and Comparison Examples 11 and 12 were evaluated on surface glossiness of the magnetic recording layer, squareness ratio, video output level, S/N ratio and tendency of clogging on a magnetic head according to the aforementioned tests.

The results of the evaluations are set forth in Table 5.

TABLE 5

|  | Example | | | Com. Example | |
| --- | --- | --- | --- | --- | --- |
|  | 13 | 14 | 15 | 11 | 12 |
| Water content (molar ratio) | 45 | 25 | 62.5 | 12.5 | 100 |
| Surface glossiness (%) | 255 | 251 | 254 | 235 | 240 |
| Squareness ratio | 0.82 | 0.81 | 0.81 | 0.80 | 0.78 |
| S/N ratio (dB) | +0.8 | +0.8 | +0.8 | +0.2 | +0.3 |
| Video output (dB) | +0.8 | +0.7 | +0.8 | +0.2 | +0.2 |
| Clogging on magnetic head | none | none | none | observed | observed |

EXAMPLE 16

The procedure of Example 10 was repeated except for using a vinyl chloride copolymer having a content of sodium sulfonate group of $1.0 \times 10^{-5}$ mol/g and the same other conditions as those of the vinyl chloride copolymer used in Example 10, and varying the water content in the ferromagnetic metal powder to $5.0 \times 10^{-4}$ mol/g, to prepare a video tape.

EXAMPLE 17

The procedure of Example 16 was repeated except for varying the water content in the ferromagnetic metal powder to $3.0 \times 10^{-5}$ mol/g to prepare a video tape.

EXAMPLE 18

The procedure of Example 16 was repeated except for varying the water content in the ferromagnetic metal powder to $9.0 \times 10^{-5}$ mol/g to prepare a video tape.

COMPARISON EXAMPLE 13

The procedure of Example 16 was repeated except for varying the water content in the ferromagnetic metal powder to $1.0 \times 10^{-5}$ mol/g to prepare a video tape.

COMPARISON EXAMPLE 14

The procedure of Example 16 was repeated except for varying the water content in the ferromagnetic metal powder to $1.5 \times 10^{-4}$ mol/g to prepare a video tape.

The video tapes obtained in Examples 16 to 18 and Comparison Examples 13 and 14 were evaluated on surface glossiness of the magnetic recording layer, squareness ratio, video output level, S/N ratio and tendency of clogging on a magnetic head according to the aforementioned tests.

The results of the evaluations are set forth in Table 6.

TABLE 6

|  | Example | | | Com. Example | |
| --- | --- | --- | --- | --- | --- |
|  | 16 | 17 | 18 | 13 | 14 |
| Water content (molar ratio) | 41.7 | 25 | 75 | 8.3 | 125 |
| Surface glossiness (%) | 262 | 258 | 261 | 241 | 245 |
| Squareness ratio | 0.83 | 0.82 | 0.82 | 0.81 | 0.80 |
| S/N ratio (dB) | +1.1 | +1.0 | +0.9 | +0.3 | +0.4 |
| Video output (dB) | +1.2 | +1.0 | +0.9 | +0.3 | +0.3 |
| Clogging on magnetic head | none | none | none | none | none |

We claim:

1. A magnetic recording medium comprising a non-magnetic support and a magnetic recording layer provided on the support which comprises a binder having a number average molecular weight in the range of 10,000 to 200,000 and a ferromagnetic powder dispersed therein, wherein said binder contains a resin component having a metal sulfonate group and said ferromagnetic powder contains water in an amount corresponding to moles of 20-80 times as much as the number of moles of the metal sulfonate group contained in the binder.

2. The magnetic recording medium as claimed in claim 1, wherein said ferromagnetic powder contains water in an amount corresponding to moles of 40-60 times as much as the number of moles of the metal sulfonate group contained in the binder.

3. The magnetic recording medium as claimed in claim 1, wherein said ferromagnetic powder is a ferromagnetic metal group.

4. The magnetic recording medium as claimed in claim 1, wherein said resin component having a metal sulfonate group is a vinyl chloride copolymer having a metal sulfonate group.

5. The magnetic recording medium as claimed in claim 1, wherein the amount of said metal sulfonate group contained in the resin component having a metal sulfonate group is in the range of $1 \times 10^{-5}$ to $5 \times 10^{-4}$ mol/g.

6. The magnetic recording medium as claimed in claim 1, wherein said resin component having a metal sulfonate group is contained in the magnetic recording layer in an amount of 5 to 50 parts by weight based on 100 parts by weight of the ferromagnetic powder.

7. The magnetic recording medium as claimed in claim 1, wherein said binder has a number average molecular weight not less than 15,000.

8. The magnetic recording medium as claimed in claim 1, wherein said ferromagnetic powder has a specific surface area of not less than 41 $m^2$/g.

* * * * *